Oct. 2, 1934.  L. DUFOUR  1,975,417
MOTOR PROPELLED CULTIVATOR OR GARDEN TRACTOR
Filed Oct. 23, 1933  2 Sheets-Sheet 1

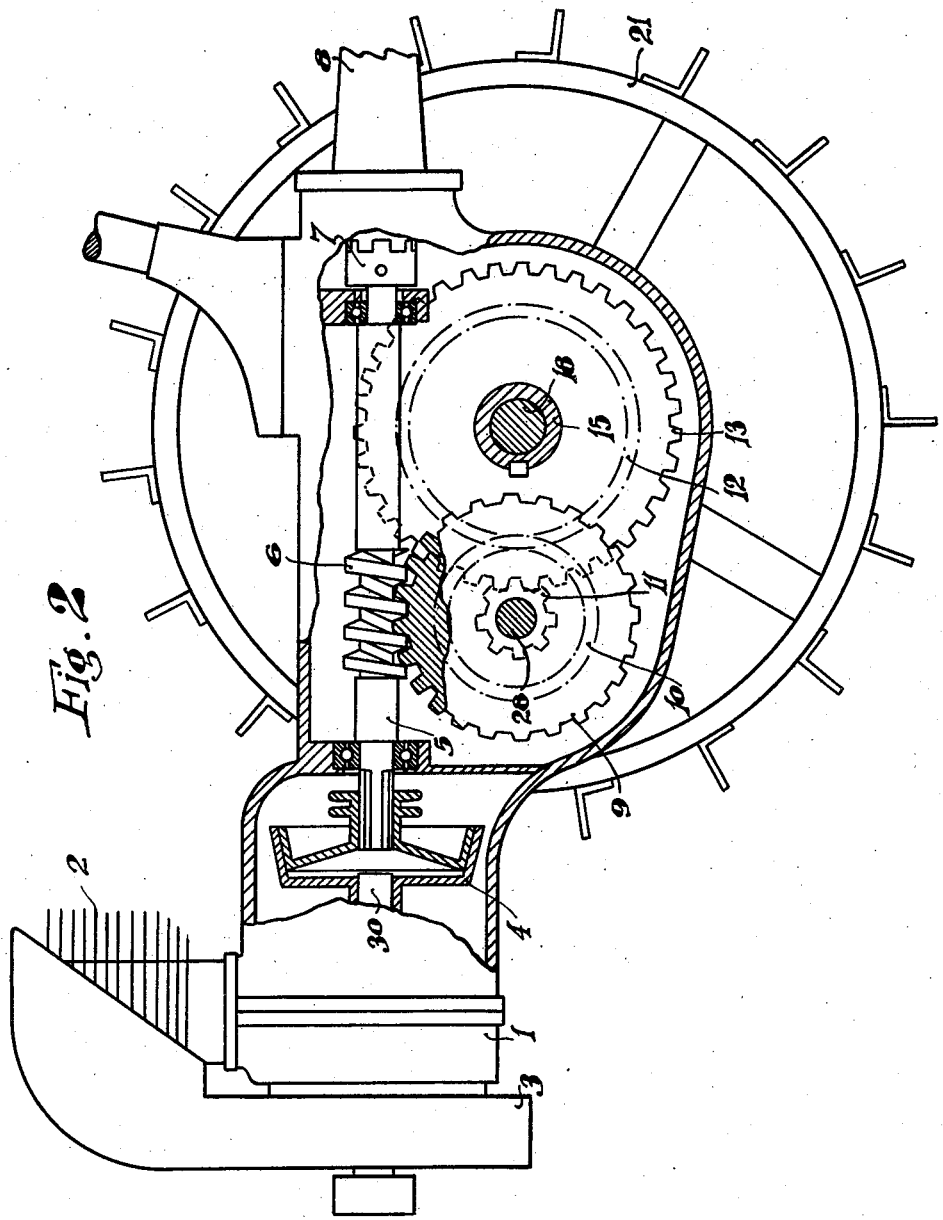

Patented Oct. 2, 1934

1,975,417

UNITED STATES PATENT OFFICE 1,975,417

MOTOR PROPELLED CULTIVATOR OR GARDEN-TRACTOR

Léon Dufour, Versoix, Switzerland

Application October 23, 1933, Serial No. 694,875
In Switzerland October 4, 1933

2 Claims. (Cl. 180—19)

The present invention relates to change speed gears for motor propelled cultivators or garden-tractors. Particularly smaller sized cultivators must usually have two advance speeds, a slow speed used when working at relatively great depth, and a faster speed used when working at small depth and for advancing the cultivator on a road when it does not work. The actually used small cultivators are therefore always provided with a change speed gear having a sliding wheel train of the type well known in automobile gears. These mechanisms have however the drawback that they are relatively expensive and need much room in lateral direction, while small cultivators must be cheap so that they may be employed by small planters and growers and must also be as narrow as possible to be capable of passing between rows of plants.

The present invention has as its object the provision of a change speed gear for motor propelled cultivators which will avoid the mentioned inconveniences.

The invention consists in a driving unit for cultivators having two traction wheels capable of being selectively locked to one or the other of two rotatable coupling members each of which is operatively connected to the motor by means of a train of continuously meshing gear wheels, the two trains having different transmission ratio, so that when locking the traction wheels to one of the coupling members a slow speed may be obtained, and when locking the traction wheel to the other coupling member and disengaging the first coupling member, a fast speed will be obtained.

A further object is the provision of simple and easily operable coupling means, such as a bolt capable of being introduced through registering holes in the traction wheels and the coupling members for effecting the change of speed of the traction wheels.

In the accompanying drawings,

Figure 2 is a side elevation of the driving unit, partly drawn in longitudinal section.

Figure 1:
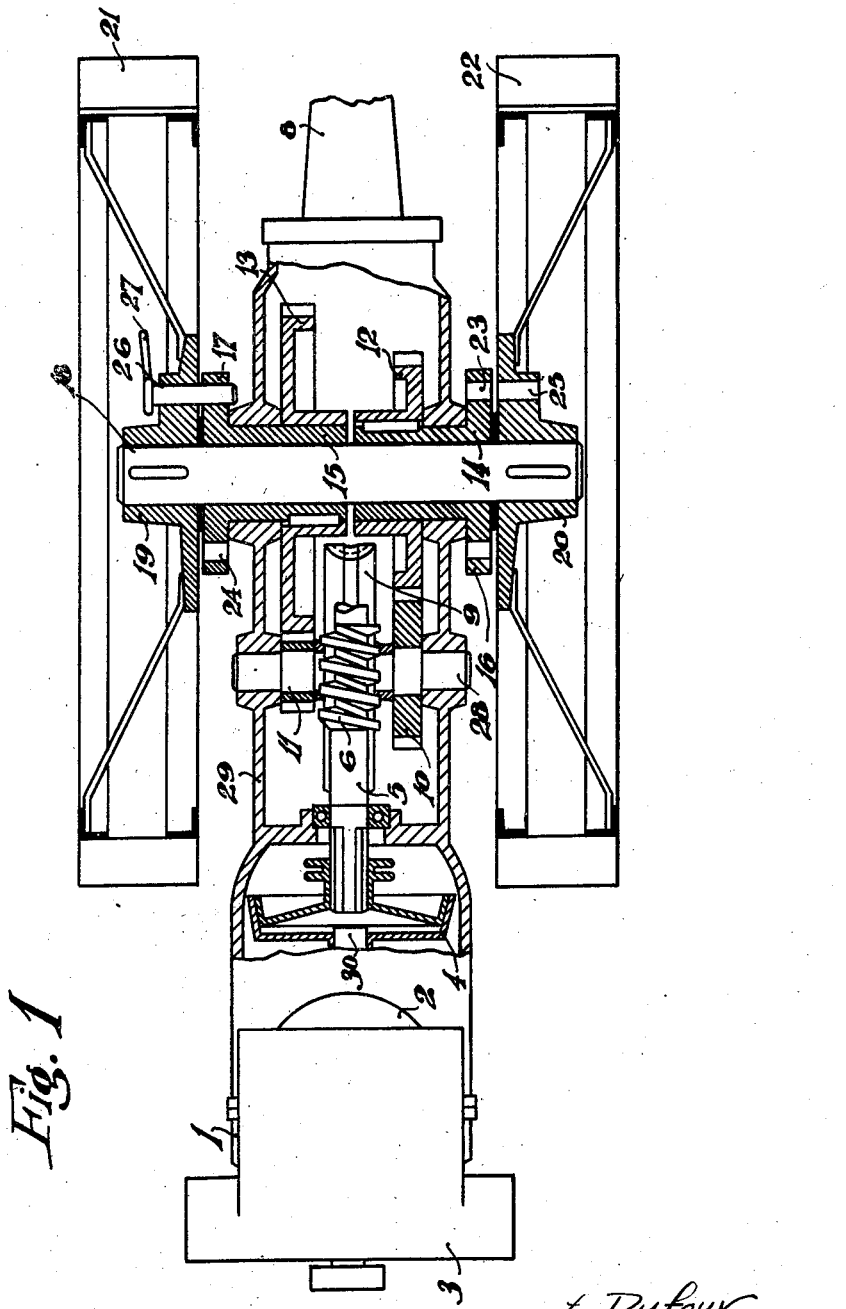
Figure 1 is a plan view of a driving unit of a cultivator according to the invention, partly drawn in horizontal section through the axis of the traction wheels.

The represented driving unit comprises an internal combustion motor 1 having a cylinder 2 and a cooler 3. The motor shaft 30 is connected to one part of a friction clutch 4 of which the other part is slidably mounted on the intermediate shaft 5. The actuating means for the friction clutch being of conventional design, are not shown. The shaft 5 carries a worm gear 6 and its rear end is provided with a sleeve 7 of a claw coupling forming a power take off for cultivating tools. The worm gear transmits movement from the motor to the driving wheels and the sleeve 7 transmits movement from the motor to cultivating tools which may be secured to the rear of the driving unit, such as rotary tilling cutters, mowers, or other tools. The represented driving unit may however be used as tractor only for pulling a plow or other implements in which case the coupling sleeve 7 would not be used. The represented member 8 may thus indicate a plow carrier as well as the central arm of rotary tilling tools.

The worm 6 drives a worm wheel 9 carried by a shaft 28 to which are secured a small pinion 11 and a greater pinion 10. The pinion 10 is constantly in mesh with the gear wheel 12 keyed to a sleeve 14, and the pinion 11 is constantly in mesh with the gear wheel 13 keyed to a sleeve 15, the two sleeves 14 and 15 being integral with disks 16 and 17, respectively, situated each between the casing 29 and one of the traction wheels 21 and 22. The sleeves 14 and 15 are loosely mounted on a shaft 18 extending beyond the disks 16 and 17. The traction wheels 21 and 22 are keyed with their hubs 19 and 20 to the two ends of the shaft 18. Each disk 16 and 17 is provided with a series of holes 23 and 24 and the wheel hubs are provided each with a corresponding hole 25 and 26, respectively. A bolt 27 is engaged in the hole 26 of the hub 19 and penetrates through one of the holes 24 of the disk 17, so that as represented in Fig. 1, the traction wheel 21 and therefore also the wheel 22 are connected to the disk 17 which is rotated by the small pinion 11 and the gear wheel 13. The cultivator moves therefore in first speed, that means at slow speed. The bolt 27 may be removed by hand from the hub 19 and inserted in the hole 25 of the hub 20 and in one of the holes 23 of the disk 16. The two traction wheels 21, 22 turn then at second or fast speed, since the disk 16 is driven by the larger pinion 10 and the smaller gear wheel 12. It would also be possible to connect the two disks 16 and 17 by means of a pawl and ratchet mechanism to the wheels 21 and 22, instead of by the bolt 27. The advantage of using a bolt resides in the fact that the driver cannot forget to release one of the traction wheels when the other wheel is engaged, as there is only one connecting bolt at the disposition of the driver.

The described mechanism is simpler and cheaper to manufacture than conventional change speed gears, precisely for the reason of the absence of any gear shift mechanism, and it requires less space in width. Also the manual engagement of a traction wheel with a coupling disk does not form an inconvenience, because small cultivators do almost never require a change of speed during a working period. It will be known before starting a certain work, which speed is required and the wheels will be coupled accordingly.

I claim:—

1. In a change speed gear for motor propelled cultivators having two traction wheels, a shaft connecting the two wheels and keyed to the hub of each wheel, two sleeves loosely mounted on said shaft intermediate the two traction wheels, each sleeve having its end situated adjacent one traction wheel provided with a coupling disk, means for selectively coupling one or the other of said disks to the corresponding wheel hub, a motor actuated drive shaft, and two trains of continuously meshing gear wheels having different transmission ratios for operatively connecting the drive shaft to both said sleeves.

2. In a change speed gear for motor propelled cultivators having two traction wheels, a shaft connecting the two wheels and keyed to the hub of each wheel, two rotatable sleeves loosely mounted on said shaft intermediate the two traction wheels, each sleeve having its end situated adjacent one traction wheel provided with a coupling disk, the hub of each traction wheel and the corresponding coupling disk being provided with registering holes, a locking bolt adapted to be selectively introduced through registering holes of one or the other wheel hub and the corresponding coupling disk, a motor actuated drive shaft, and two trains of continuously meshing gear wheels having different transmission ratios for operatively connecting the drive shaft to both said sleeves.

LÉON DUFOUR.